(12) United States Patent
Martin

(10) Patent No.: US 6,846,017 B2
(45) Date of Patent: Jan. 25, 2005

(54) HITCH MOUNTED CARGO CARRIER

(76) Inventor: Dwayne A. Martin, 3904 Grave Run Rd., Millers, MD (US) 21102

( * ) Notice: Subject to any disclaimer, the term of this patent is extended or adjusted under 35 U.S.C. 154(b) by 0 days.

(21) Appl. No.: 10/279,199

(22) Filed: Oct. 23, 2002

(65) Prior Publication Data

US 2004/0080149 A1 Apr. 29, 2004

(51) Int. Cl.$^7$ .................................................. B60R 9/06
(52) U.S. Cl. ...................... 280/769; 280/47.18; 280/507; 224/524
(58) Field of Search ................................. 280/769, 656, 280/47.131, 47.17, 47.18, 47.23, 47.24, 47.27, 47.33, 504, 507; 224/524

(56) References Cited

U.S. PATENT DOCUMENTS

| | | | | |
|---|---|---|---|---|
| 3,724,694 A | * | 4/1973 | Wilson | 414/462 |
| 4,234,284 A | * | 11/1980 | Hauff | 414/462 |
| 4,593,840 A | | 6/1986 | Chown | 224/42.03 A |
| 4,744,590 A | | 5/1988 | Chesney | 280/769 |
| 4,813,584 A | * | 3/1989 | Wiley | 224/510 |
| 4,844,528 A | | 7/1989 | Johnson | 296/37.1 |
| 4,934,894 A | * | 6/1990 | White | 414/462 |
| 5,215,234 A | * | 6/1993 | Pasley | 224/508 |
| 5,328,066 A | * | 7/1994 | Cappuccio et al. | 224/506 |
| 5,368,209 A | * | 11/1994 | Hill | 224/497 |
| 5,427,289 A | * | 6/1995 | Ostor | 224/499 |
| 5,489,109 A | * | 2/1996 | Murphy | 280/415.1 |
| 5,586,702 A | * | 12/1996 | Sadler | 224/521 |
| 5,732,866 A | | 3/1998 | Janek | 224/527 |
| 5,788,135 A | | 8/1998 | Janek | 224/527 |
| 5,826,768 A | * | 10/1998 | Gamulo | 224/486 |
| 5,857,824 A | * | 1/1999 | De Aquiar | 414/462 |
| 5,881,937 A | | 3/1999 | Sadler | 224/509 |
| 5,996,869 A | | 12/1999 | Belinky et al. | 224/510 |
| 6,006,973 A | * | 12/1999 | Belinky et al. | 224/510 |
| 6,024,374 A | * | 2/2000 | Friesen | 280/511 |
| 6,095,387 A | | 8/2000 | Lipscomb | 224/485 |
| 6,099,035 A | | 8/2000 | Garvin, III | 280/769 |
| 6,179,184 B1 | * | 1/2001 | Belinky et al. | 224/510 |
| 6,193,124 B1 | * | 2/2001 | Brazil et al. | 224/521 |
| 6,202,909 B1 | * | 3/2001 | Belinky et al. | 224/524 |
| 6,253,981 B1 | * | 7/2001 | McLemore | 224/526 |
| 6,260,752 B1 | | 7/2001 | Dollesin | 224/524 |
| 6,345,749 B1 | * | 2/2002 | Hamilton | 224/509 |
| 6,390,343 B1 | * | 5/2002 | Jain | 224/524 |
| 6,419,244 B2 | * | 7/2002 | Meabon | 280/47.27 |
| 6,471,104 B1 | * | 10/2002 | Janek | 224/498 |
| 6,511,088 B2 | * | 1/2003 | Kahlstorf | 280/415.1 |
| 6,581,952 B1 | * | 6/2003 | MacKarvich | 280/457 |

* cited by examiner

Primary Examiner—Christopher P. Ellis
Assistant Examiner—Jeff Restifo
(74) Attorney, Agent, or Firm—Armstrong, Kratz, Quintos, Hanson & Brooks, LLP

(57) ABSTRACT

A hitch mounted cargo carrier is used in combination with a vehicle having an adapter. The cargo carrier has a connecting bar received in the adapter. An extending arm on the connecting bar is connected to a channel on the lower side of a body of the cargo carrier. Accessories are removably connected to the cargo carrier to provide various use of the cargo carrier. A method of use of the cargo carrier is disclosed.

2 Claims, 7 Drawing Sheets

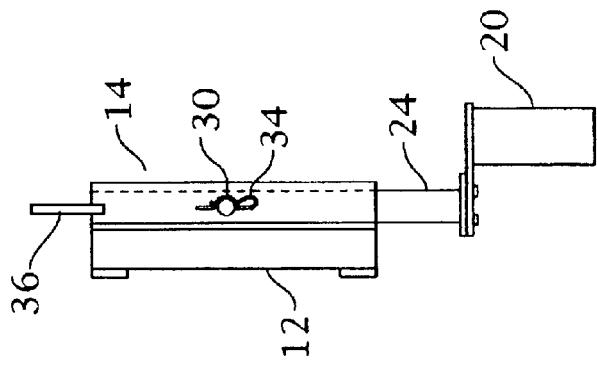
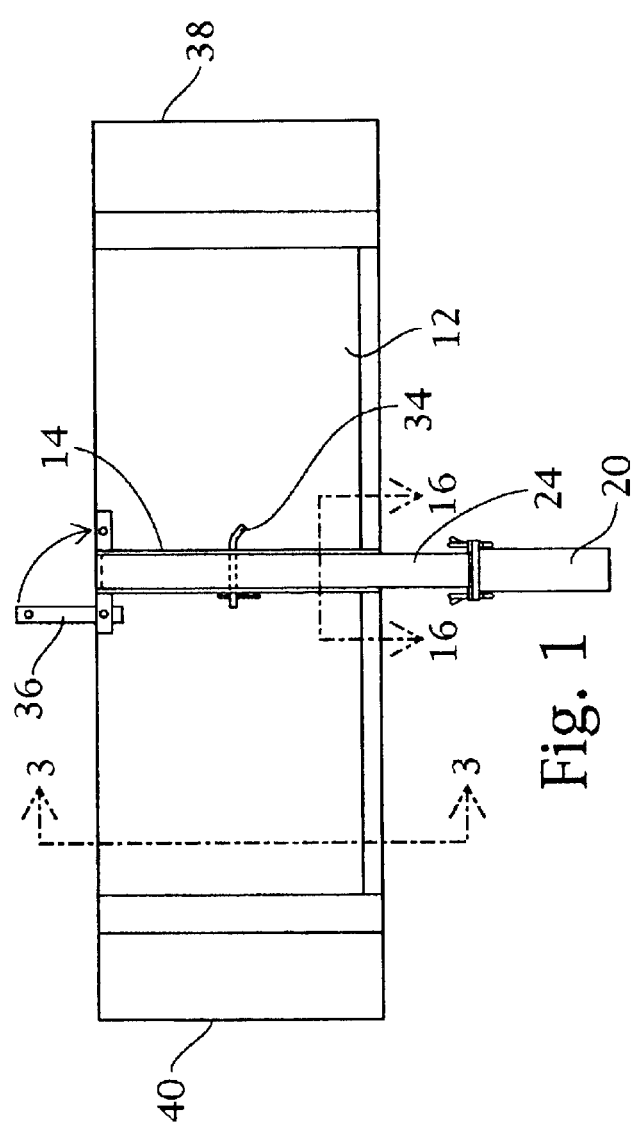
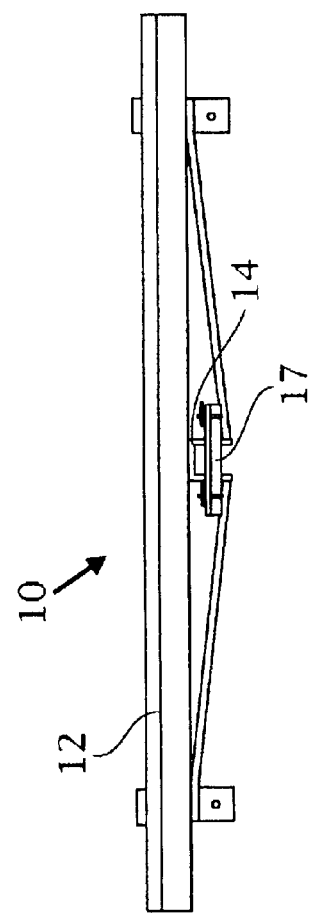

HITCH MOUNTED CARGO CARRIER

BACKGROUND OF THE INVENTION

1. Field of the Invention

The present invention relates to a cargo carrier and more specifically to a cargo carrier which may be connected to the back of a vehicle.

2. Description of Related Art

Individuals and businesses have a continuing interest and need in having a cargo carrier which can be easily and rapidly mounted on the back of a passenger vehicle, station wagon, light truck, minivan, all terrain vehicle (ATV) and/or sports utility vehicle. Not only for business applications, the cargo carrier may be used for vacations such as camping and visits to the beach.

In U.S. Pat. No. 4,593,840, Chown discloses a load carrying unit connected to a vehicle by means of a standard ball and socket hitch and having a pair of wheels, lockable, raisable and lowerable. A number of embodiments are disclosed.

In U.S. Pat. No. 4,744,590, Chesney discloses a removable attachable suspended trailer device for providing additional storage capacity. The suspended trailer includes retractable wheeled support legs. When the trailer is to be rolled to any convenient location for unloading, it is detached from the towing vehicle, Several embodiments are disclosed.

Johnson in U.S. Pat. No. 4,844,528, discloses retractable wheeled legs for a storage trunk so that the trunk may be removed from the vehicle for mobile positioning to a selected location. It is not attached to a cargo hitch.

In U.S. Pat. No. 5,732,866, Janek discloses a cargo carrier comprising a frameless L-shaped support beam in combination with a wheeled container adapted to be pivotally loaded using pivot latches. The carrier is for vehicles other than passenger automobiles.

In U.S. Pat. No. 5,788,135, Janek disclosed another embodiment of U.S. Pat. No. 5,732,866 in which the wheeled container is connected to the truck by a monorail.

In U.S. Pat. No. 5,881,937, Sadler discloses an example of a vehicle cargo carrier attached to a common trailer hitch.

Belinky et al in U.S. Pat. No. 5,996,869, disclose a cargo carrier platform for mounting to a vehicle hitch allowing cargo to be transported outside the vehicle. A number of embodiments are disclosed.

Lipscomb in U.S. Pat. No. 6,095,387, discloses a cargo carrier for attaching behind a vehicle to transport cargo, bicycles and the like. Picnic table legs can be secured to a bottom portion of the carrier to form a picnic table from the carrier. The use of additional accessories is disclosed such as mud flaps and supplemental lighting.

In U.S. Pat. No. 6,099,035, Garvin, III discloses a cart apparatus which can be used either attached to a vehicle or freestanding on its own wheels.

In U.S. Pat. No. 6,260,752, Dollesin discloses a cargo holder having an arm with a front end for attaching to a trailer hitch. The cargo holder has retractable legs with wheels. A number of embodiments are disclosed.

The activity in this field is indicative of the need for a vehicle mountable cargo carrier.

BRIEF SUMMARY OF THE INVENTION

It is an object of the present invention to provide a relatively lightweight cargo carrier which is mountable on the back of a vehicle and which can be used as a wheeled cart and a table.

It is a further object of the present invention to provide a cargo carrier which is easy to load and can be loaded from different positions.

In accordance with the teachings of the present invention, there is disclosed a hitch mounted cargo carrier in combination with a vehicle, the vehicle having an adapter to receive a connecting bar. The carrier has a body having an upper side and lower side, a first end, and an opposite second end. A channel is formed on the lower side of the body parallel to, and approximately at a midpoint between, the first end and the second end of the body. The connecting bar has an extending arm having an end distal from the vehicle. The connecting bar is received in the channel formed under the body wherein the body is supported on the vehicle. Means are provided for releasably connecting the end of the connecting bar to the body.

In further accordance with the teachings of the present invention, there is disclosed a hitch mounted cargo carrier in combination with a vehicle, the vehicle having an adapter to receive a connecting bar. The carrier has a body having a first end, and an opposite second end. Receiving means being formed under the body approximately at a midpoint between the first end and the second end of the body. The connecting bar has an extending arm which is received in the receiving means formed under the body wherein the body is supported on the vehicle. The first end of the body has a platform formed thereon, the platform extending upwardly from the first end of the body. A pair of wheels are removably connected to the first end of the body opposite from the platform. A pair of handles are removably connected to the second end of the body. The body with the wheels and handle may be used as a hand cart to load cargo on the platform and cart the cargo to the vehicle. The body together with the cargo may be mounted on the arm of the connecting bar, the body being elevated and disposed transversely with respect to the vehicle.

In still further accordance with the teachings of the present invention, there is disclosed a method of transporting cargo with a vehicle having the steps of providing a body having a first end and an opposite second end. A platform extends upwardly from the first end. A pair of wheels are removably connected to the first end opposite to the platform. A pair of handles are removably connected to the second end of the body. A receiving means is formed on an underside of the body. A connecting bar having an extending arm is provided. The connecting bar is removably attached to the vehicle wherein the extending arm protrudes from the vehicle. The body is held upright, using the handles, and cargo is loaded on the platform of the body. The body is tilted and the body with the cargo is wheeled to the vehicle. The extending arm of the connecting bar is disposed in the receiving means on the body. The body is leveraged on the extending arm of the connecting bar to dispose the body approximately horizontally, transversely with respect to the vehicle and elevated. The body is locked onto the extending arm of the connecting bar. The cargo is secured to the body for transport of the body and cargo.

In another aspect, there is disclosed a method of transporting cargo with a vehicle having the steps of providing a body having an upper side, a lower side, a first end and an opposite second end. A receiving means is formed on an underside of the body. A plurality of accessories are provided to be attached to the body. At least one of the accessories is selected and the at least one accessory is removably attached to the lower side of the body. At least a second one of the accessories is selected and the at least a second one of the accessories is removably attached to the upper side of the body. A connecting bar having an extending arm is provided. The connecting bar is removably attached to the vehicle wherein the extending arm protrudes from the vehicle. The body with the accessories thereon is disposed onto the connecting bar such that the extending arm is received in the receiving means on the underside of the body. The extending arm is secured to the receiving means, and the cargo is secured to the body for transport of the body and cargo.

These and other objects of the present invention will become apparent from a reading of the following specification taken in conjunction with the enclosed drawings.

BRIEF DESCRIPTION OF THE DRAWINGS

FIG. 1 is a bottom plan view of the body of the cargo carrier of the present invention showing the extending arm of the connecting bar received in the receiving means.

FIG. 2 is a side elevation view of the body of the cargo carrier of the present invention.

FIG. 3 is a cross-section view taken across the lines 3—3 of FIG. 1.

DESCRIPTION OF THE EMBODIMENTS

Figure 4:
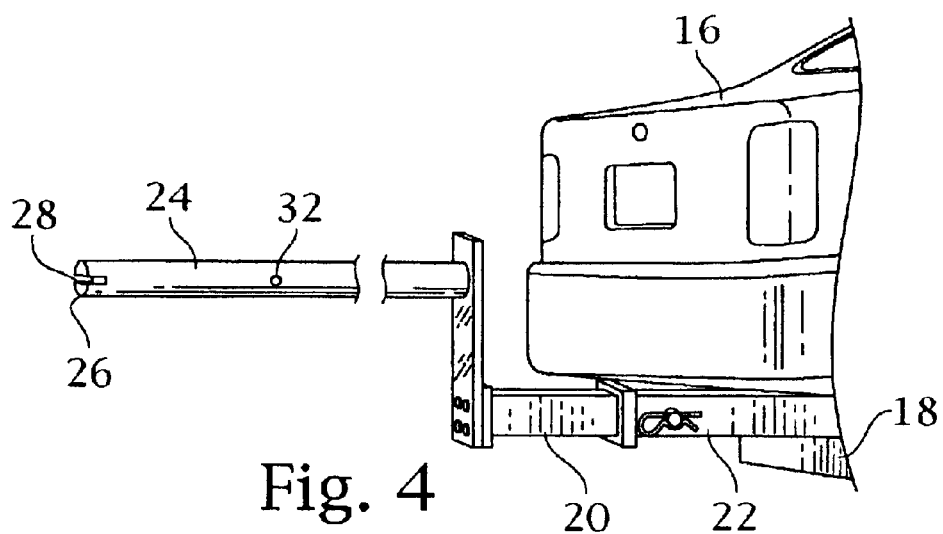
FIG. 4 is a perspective view of the connecting bar mounted in the vehicle.
Figure 5:
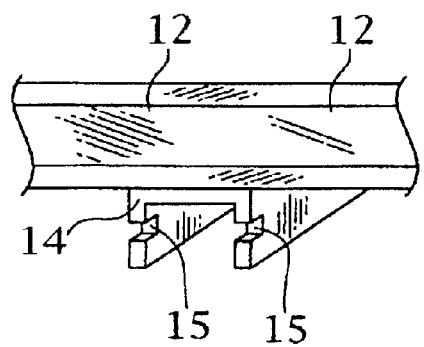
FIG. 5 is a respective view of the end of the channel adjacent to the body showing the notch formed in the channel.
Figure 6:
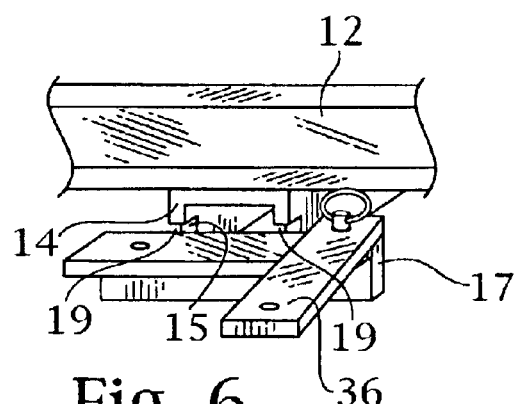
FIG. 6 is a perspective view showing the blocking means connected to the end of the channel.
Figure 7:
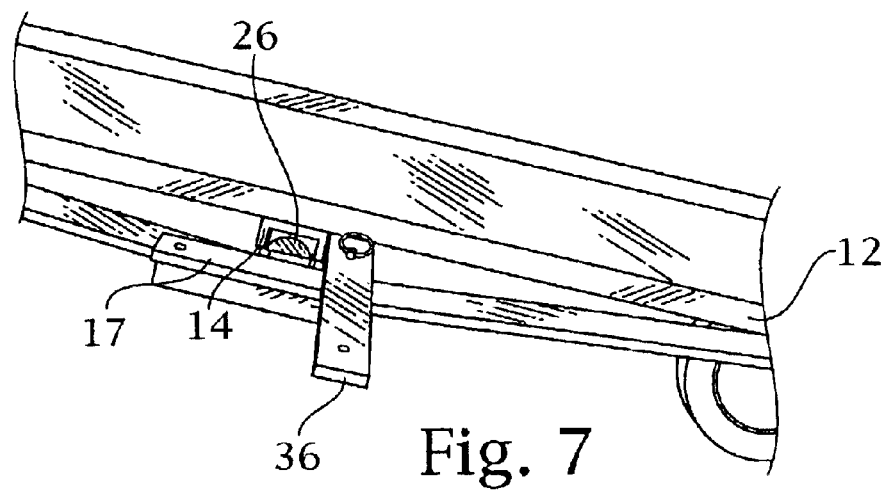
FIG. 7 is a perspective view of the pivoting level lock plate extending outwardly from the body.
Figure 8:
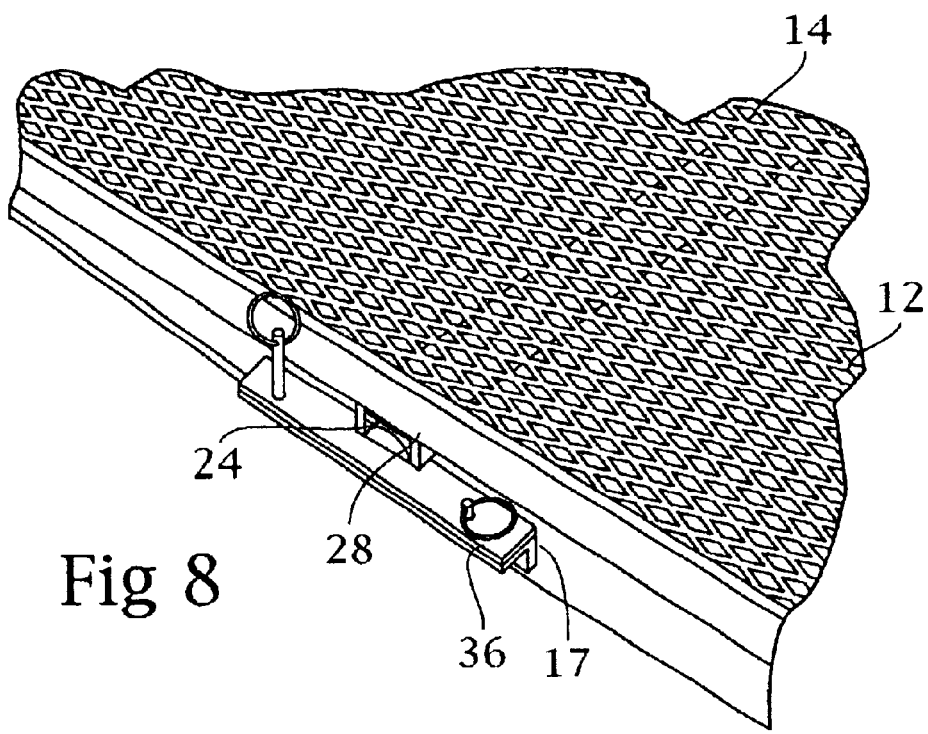
FIG. 8 is a perspective view of the pivoting level lock plate pivoted to a closed position adjacent to the body and engaging the slot in the extending arm.

Referring to FIGS. 1–3, the cargo carrier 10 has a generally flat body 12 which is approximately 60 inches long and 22 inches wide. These dimensions are not critical and are not a limit to the size of the body. However, these dimensions allow the cargo carrier 10 to be transported through a standard doorway as will be described. Also, the length of the body is less than the width of most vehicles such that the cargo carrier does not obstruct the tail lights on the rear of the vehicle on which the cargo carrier is mounted.

A channel 14 (or receiving means) is formed on the underside of the body 12 extending the entire width of the body 12 and located approximately at a midpoint between the opposite ends of the body 12. Preferably, the channel 14 has a U-shape with legs forming an opening in the U oriented outwardly from the body.

As shown in FIGS. 5–8 at one end of the channel 14, a notch 15 is formed in each leg of the channel. A blocking means 17 is formed below the notch 15 such that a space 19 is formed above the blocking means 17.

The vehicle 16 may be a passenger vehicle, a station wagon, a van, a sports utility vehicle, a truck, a mobile home, or any vehicle 16 which has a hitch mounting means 18 connected to the frame of the vehicle at the rear, or the front, of the vehicle (FIG. 4). The hitch mounting means 18 is considered as an adapter to connect the vehicle 16 with the cargo carrier 10 as will be described. Most adapters 18 have a rectangular or square opening oriented rearwardly into which a connecting bar is disposed. Typically, a through opening is formed in the adapter 18 and in the connecting bar. A pin is disposed through the openings and secured with a hitch pin to prevent separation of the adapter and the connecting bar.

The connecting bar 20 of the present invention preferably has a rectangular or square first end 22 which is proximal to the vehicle 16 and which cooperates with the adapter 18. An extending arm 24 is formed on the connecting bar 20. The extending arm 24 protrudes rearwardly from the back of the vehicle 16 to form a second end 26 of the connecting bar 20. The extending arm 24 may extend straight back from the adapter 18 but preferably is at an angle. The extending arm 24 may be in the same plane, in a higher plane or in a lower plane as compared to the adapter 18. The extending arm 24 and the adapter 18 may each have a plate formed perpendicularly thereto and the plates are abutted to one another. A plurality of openings in the plate may be aligned and pins or bolts may be received in the openings to connect the extending arm 24 with the adapter 20 (FIGS. 1, 3 and 4). Adjusting the alignment of the openings provides a means to vary the distance between the extending arm 24 and the adapter 18. The extending arm 24 preferably is round but may be of any geometric cross-section (e.g., rectangular, square, oval). The channel 14 may pivot when not locked in place. The width of the extending arm 24 is slightly less than the width of the channel 14 formed on the underside of the body 12. It is preferred that the extending arm 24 be snugly received in the channel 14. The extending arm 24 preferably has a length slightly greater than the width of the body 12. Thus, as an example, if the body 12 has a width of 22 inches, the extending arm preferably has a minimum length of 26 inches. These dimensions are not critical and are in no manner considered to be a limitation.

A through opening 30 is formed transversely in the channel 14 at a point approximately at the midpoint between the sides of the body 12. The through opening 30 is formed in both legs of the U-shaped channel 14. A cooperating opening 32 is formed in the extending arm 24 such that the through opening 30 may be aligned with the opening 32 in the extending arm 24 by moving the body 12 lengthwise on the extending arm 24 as will be described. The cooperating opening 32 may be a notch or a full hole. A hitch pin 34 is oriented through the aligned openings and secures the body 12 to the extending arm 24 of the connecting bar 20. A spring clip or other locking means is connected to the hitch pin 34 to prevent removal of the hitch pin 34. If desired, a hasp on a key or combination lock could be disposed through the aligned openings as a substitute for the hitch pin. This would prevent theft of the body.

The cooperating opening 32 in the extending arm 24 is spaced at approximately half the width of the body 12 as measured from the end 26 of the extending arm 24. Thus, the arm 24 is not substantially weakened when forces are applied to the arm 24 in use of the cargo carrier 10. In some prior art, openings were formed in hitch bars proximal to the vehicle.

The end 26 of the extending arm 24 which is distal from the vehicle 16 has a horizontal cross slot 28 formed therein. As shown in FIGS. 2–6, a level lock pivoting plate 36 is mounted on the blocking means 17 on the side of the body 12 where the channel 14 terminates such that the surface of the plate 36 is parallel to the surface of the body 12. When the pivoting plate 36 is moved to be parallel to the side of the body 12, the thickness dimension of the plate 36 is received in the horizontal cross slot 28 on the end 26 of the extending arm 24 and in the space 19 above the blocking means 17. A pin or locking means retains the pivoting plate in this position. The pivoting plate 36 further secures the body 12 to the extending arm 24 and reduces undesirable lateral, vertical or rotational movement therebetween.

The body 12 of the cargo carrier has a frame forming a first end 38, an opposite second end 40, an upper side and an opposite lower side. Within the frame, the body 12 may be a full uninterrupted deck, a mesh, a grating, a plurality of cross members or any combination thereof. The frame may be in the form of sidewalls having a desired height above or below the plane of the upper surface of the body 12. A plurality of accessories may be connected to the body 12 extending upwardly and/or downwardly from the body 12. These accessories preferably are removably connected to provide a versatile cargo carrier. The first end 38 of the body 12 is a mirror image of the second end 40 of the body 12 and the accessories may be interchangeably attached to either end of the body.

Figure 9:
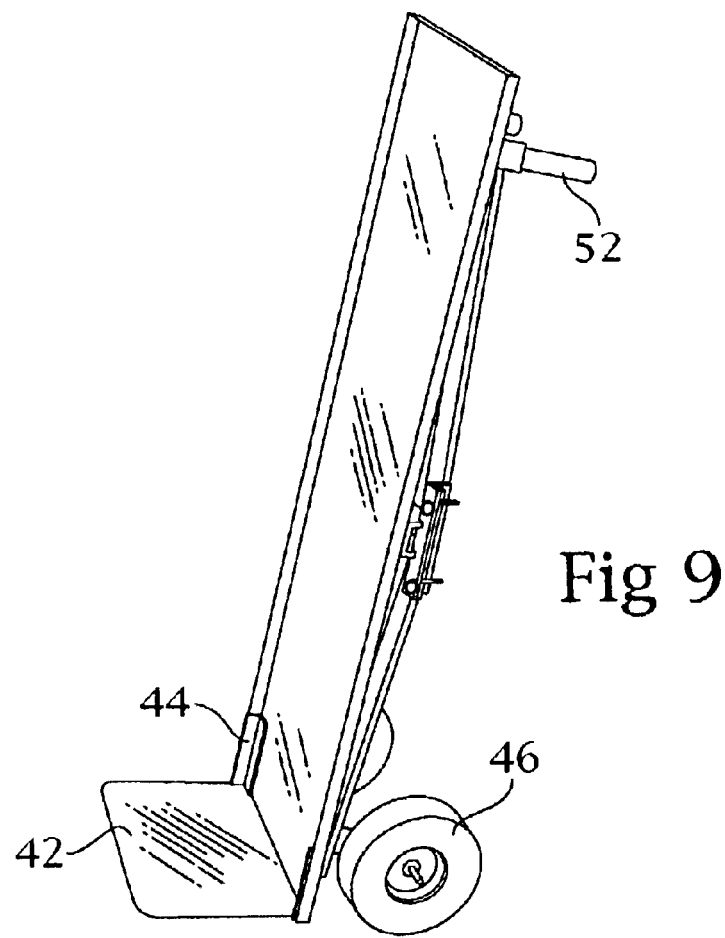
FIG. 9 is a perspective view of the cargo carrier having accessories to serve as a hand cart.
Figure 10:
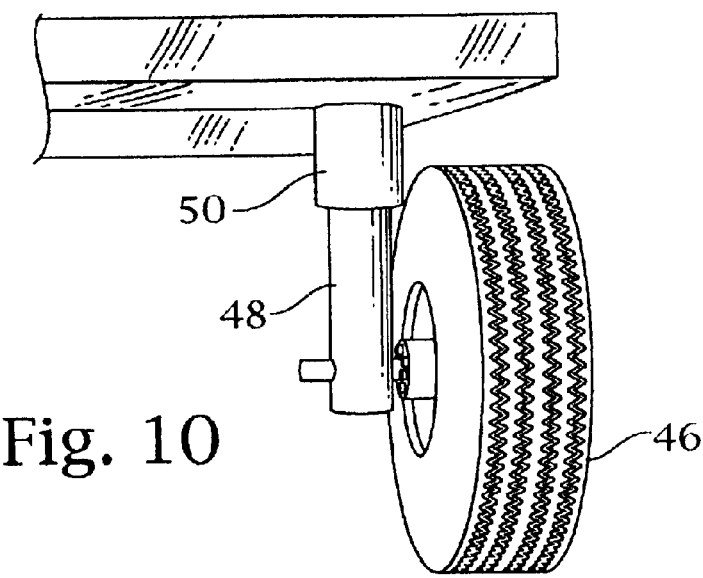
FIG. 10 is a perspective view showing a wheel attached to the lower side of the body of the cargo carrier.

In a preferred embodiment, a platform 42 may be removably attached to either the first end 38 or the second end 40 of the body (FIG. 9). The platform 42 has a flat surface formed at right angle to supports 44 which are disposed on the upper surface of the body 12. Removable connections are made between the supports 44 and the surface of the body or the sides of the body. The removable connections may be pins, clamps or any means known to persons skilled in the art. When connected, the flat surface extends outwardly from the body in the fashion of a blade which can be slid under a crate, box or other cargo to assist in loading the cargo onto the body 12. This embodiment of the cargo carrier 10 also has a pair of wheels 46 removably connected to the lower side of the body 12 opposite the platform 42. The wheels 46 may be mounted on a post 48 (FIG. 10) which is received in a socket 50 formed on the lower side of the body 12 or the wheels may be removably attached by any means known to persons skilled in the art. A locking means such as a removable pin may secure the wheels 46 to the socket 50. Also, the wheels 46 may be removably connected to the body 12 in the absence of the platform 42, if desired. When the platform 12 and wheels 46 are removably attached to the body 12, it is also preferred to have a pair of handles 52 removably connected to the lower side of the body 12 at the end of the body opposite from the wheels 46. The handles 52 may be received in sockets 50 formed on the lower side of the body. In this manner, a hand cart is formed from the body 12 which can be used as will be described.

Figure 11:
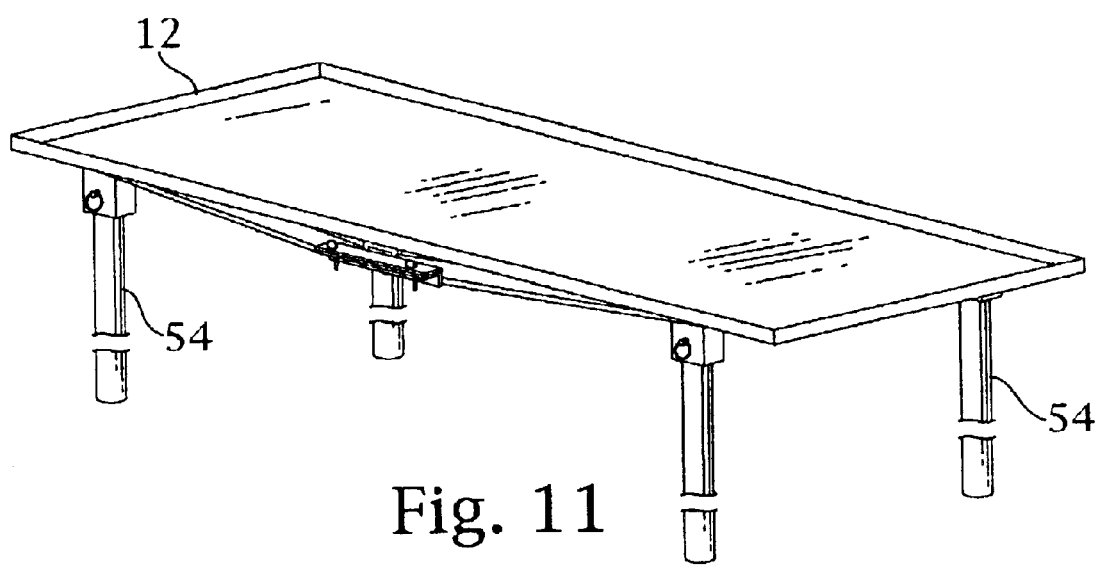
FIG. 11 is a perspective view showing four legs attached to the body.
Figure 12:
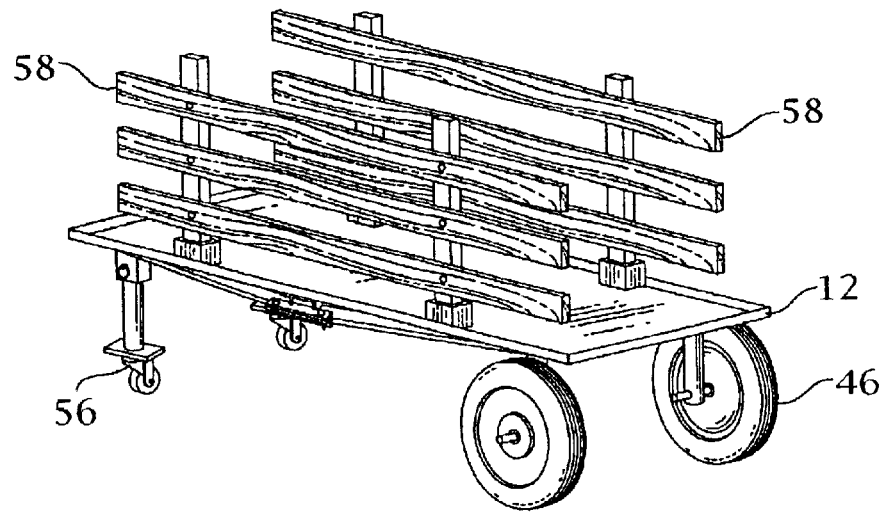
FIG. 12 is a perspective view showing wheels and casters attached to the lower side of the body and side rails attached to the upper side of the body.
Figure 13:
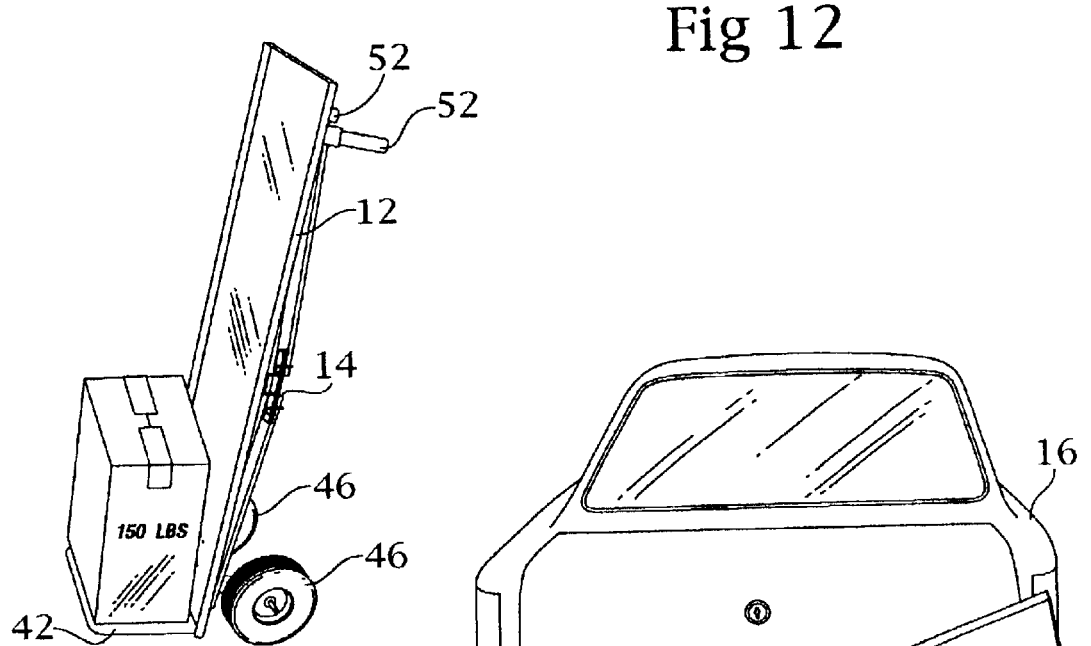
FIG. 13 is a perspective view of the cargo carrier assembled as a hand cart and having a package thereon.
Figure 14:
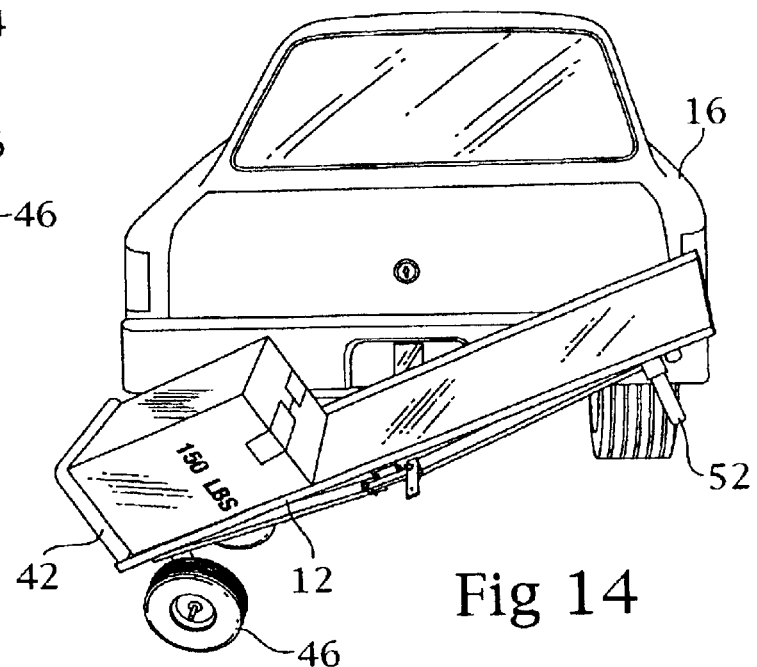
FIG. 14 is a perspective view showing the tilting of the hand cart of FIG. 13.
Figure 15:
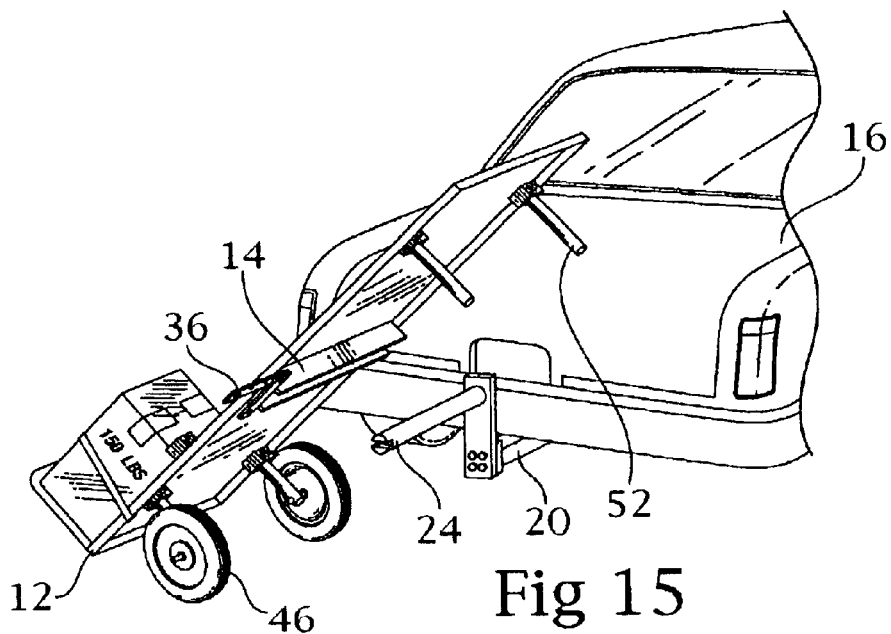
FIG. 15 is a perspective view showing the extending arm of the connecting bar being received in the channel on the body.
Figure 16:
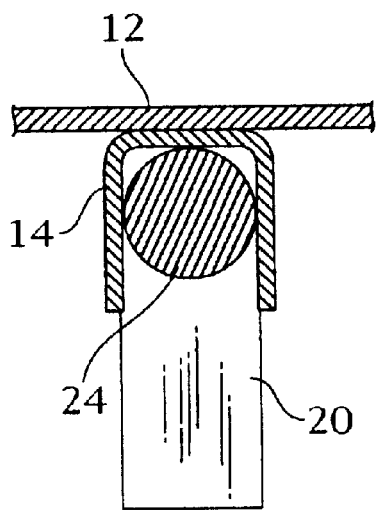
FIG. 16 is a cross-section view taken across the lines 16—16 of FIG. 1 and showing the extending arm received in the channel.
Figure 17:
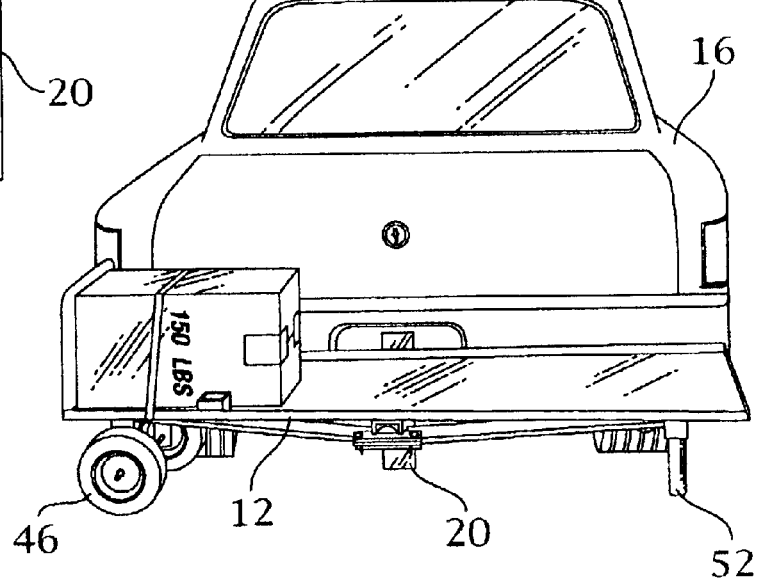
FIG. 17 is a perspective view showing the cargo carrier with the cargo mounted on the rear of a vehicle.
Figure 18:
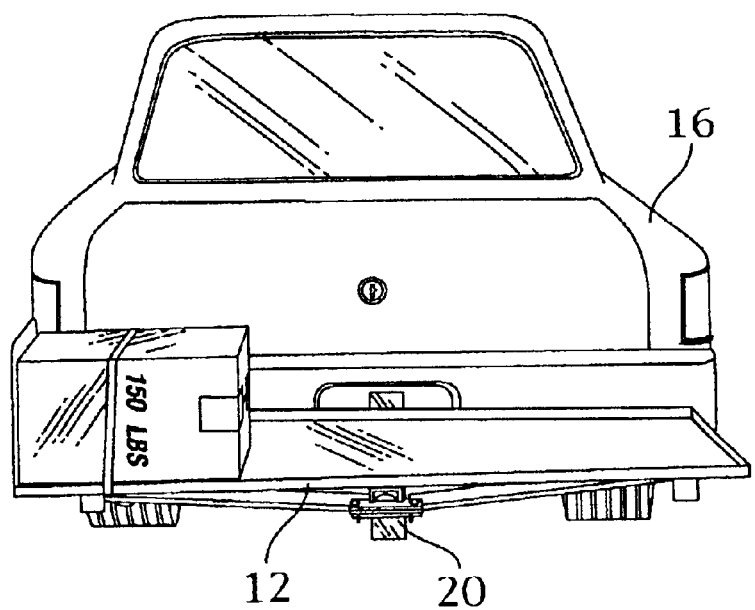
FIG. 18 shows FIG. 17 with the wheels and handles removed for transport of the cargo carrier on the vehicle.

Additional accessories may be used with the body 12. A set of four legs 54 may be removably attached to the lower side of the body 12 so the body may serve as a table top (FIG. 11). The legs 54 may be made of any desired length or may be telescoping to provide an adjustable height for the table. A second pair of wheels or casters 56 may be attached to the lower side of the body (FIG. 12). Other accessories may be removably attached to the upper side of the body. There may be a removable side rail 58. A bike rack could also be attached to the upper side of the body 12.

The accessories preferably are removably attached to the body with a removable pin. However, the attachment may be semi-permanent such as a nut and bolt received in holes through the accessory and aligned holes through the body 12.

It is further preferred that the accessories on the upper side of the body 12 be spaced apart from the respective ends of the body 12 so that there is no obstruction of the tail light of the vehicle when the body is mounted on the vehicle as will be described.

A typical method of use of the cargo carrier 10 is shown in FIGS. 13–18. Accessories are added to the body 12 to form a hand cart as previously described. The connecting bar 20 is connected to the vehicle 16 with the extending arm 24 projecting outwardly from the vehicle. Holding the body 12 upright, and using the handles 52, cargo such as a carton, is loaded on the platform 42. Preferably, the cargo is secured to the body by a tie means. The hand cart with the cargo is wheeled to the vehicle. The hand cart is maneuvered such that the extending arm 24 is received in the channel 14 on the lower side of the body. The body 12 is leveraged on the extending arm 24 to dispose the body approximately horizontally with respect to the ground and transversely with respect to the vehicle 16. The body 12 with the accessories (wheels 46 and handles 52) are elevated above the ground. The pivoting level lock plate 36 is pivoted to be received in the cross slot 28 in the end of the extending arm 24 and in the space 19 above the blocking means 17 and is secured thereto. The through opening 30 in the channel 14 is aligned with the opening 32 in the extending arm 24 and the hitch pin 34 is disposed on the aligned openings and secured therein. The cargo is relocated on the body 12, if desired, to provide better balance on the body 12 or to avoid obstruction of the tail lights of the vehicle 16. The cargo is secured to the body 12. Although not necessary, it is preferred that the accessories such as the wheels 46, handles 52 and possibly the platform 42 be removed from the body during vehicle transport of the cargo attached to the body 12.

Figure 19:
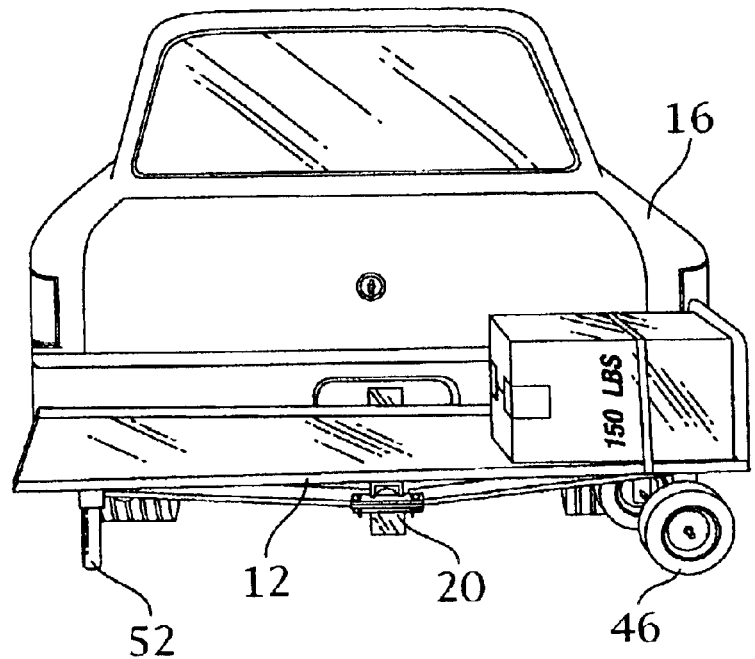
FIG. 19 shows FIG. 15 with the cargo carrier mounted from the other side of the vehicle.

It should be noted that FIGS. 13–17 show the wheels 46 of the hand cart disposed on the driver side of the vehicle 16. If, due to traffic or other space limitations, it is difficult to maneuver the hand cart and cargo in this situation, the hand cart may be assembled with the wheels 46 and the platform 42 at the opposite end of the body 12 (FIG. 19). The hand cart would then be maneuvered and mounted from the passenger side of the vehicle 16.

There are many different types of hitch mounted cargo carriers available. None address the problem of transporting heavy, bulky, or numerous small items, by vehicle, from pont A to point B. With the present invention, versatility and ease of use, unlike prior designs, is easily accessorized to be suitable for commercial and recreational use. The present invention can also be mounted onto and removed from either side of the vehicle where space or safety would limit access. The present invention lends itself well to be fabricated, cast, or molded as a means of production. The quick detach mounting system and accessory mounting brackets could be made available as separate accessories to be fastened to existing carrier platforms. A lockable receiver hitch pin may be used to prevent the unauthorized removal of the carrier, and any attached storage containers when the vehicle is unattended. The carrier has capacity of approximately 500 lbs.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A hitch mounted cargo carrier in combination with a vehicle, the vehicle having an adapter to receive a connecting bar, the carrier comprising a body having an upper side, a lower side, a first end, and an opposite second end, an inverted U-shaped channel being formed on the lower side of the body parallel to, and approximately at a midpoint between the first end and the second end of the body, the channel having an end distal from the vehicle, the channel having legs oriented outwardly from the body, the connecting bar having an extending arm having an end, distal from the vehicle, the connecting bar being received between the legs in the channel formed under the body wherein the body is supported on the vehicle, means for releasably connecting the end of the connecting bar to the body, wherein the end of the extending arm has a horizontal cross slot formed therein, the distal end of the channel having a notch formed in each leg thereof, the body having a plate pivotally mounted substantially parallel to the channel, wherein when the extending arm is received in the channel, the plate Is pivotally received in the horizontal cross slot in the extending arm and in the notch in each leg of the channel, thereby securing the body to the extending arm.

2. A hitch mounted cargo carrier in combination with a vehicle, the vehicle having an adapter to receive a connecting bar, the carrier comprising a body having a first end and an opposite second end, an inverted U-shaped receiving means being formed under the body approximately at a midpoint between the first end and the second end of the body, the connecting bar having an extending arm which is received in the receiving means formed under the body wherein the body is supported on the vehicle, the first end of the body having a platform formed thereon, the platform extending upwardly from the first end of the body, a pair of wheels removably connected to the first end of the body opposite from the platform, a pair of handles removably connected to the second end of the body, wherein the body with the wheels and handle may be used as a handcart to load cargo on the platform and cart the cargo to the vehicle, and the body together with the cargo may be mounted on the arm of the connecting bar, the body being elevated and disposed transversely with respect to the vehicle, and further comprising a pivotable plate attached on the receiving means at an end of the receiving means distal from the vehicle, the receiving means having notches formed on the end thereof, the pivotable plate engaging a cross slot in the extending arm of the connecting bar and engaging the notches in the end of the receiving means to secure the cargo carrier to the vehicle.

* * * * *